(12) United States Patent
Schmidt

(10) Patent No.: US 7,275,699 B2
(45) Date of Patent: Oct. 2, 2007

(54) MOBILE PUMPING UNIT FOR DISPENSING INSULATING MATERIAL IN SITU

(75) Inventor: Alex Schmidt, Severna Park, MD (US)

(73) Assignee: Thermal Science Technologies, LLC, Hanover, MD (US)

(*) Notice: Subject to any disclaimer, the term of this patent is extended or adjusted under 35 U.S.C. 154(b) by 652 days.

(21) Appl. No.: 10/760,690

(22) Filed: May 6, 2004

(65) Prior Publication Data

US 2005/0258269 A1 Nov. 24, 2005

(51) Int. Cl.
*A01G 25/09* (2006.01)
(52) U.S. Cl. .................. 239/172; 239/69; 239/128; 239/135; 239/142; 239/175; 239/304; 239/305; 239/432; 239/433; 239/575; 239/588; 222/145.5; 222/145.6; 222/146.1; 366/159.1
(58) Field of Classification Search ............ 239/67, 239/69, 8, 10, 13, 128, 135, 142, 146, 172, 239/175, 304, 305, 407, 422, 428, 432, 433, 239/569, 570, 575, 588, 587.1; 366/162.4, 366/159.1, 182.1, 182.2; 422/133–135; 222/129, 222/145.1, 145.5, 145.7, 146.1, 146.2, 146.6, 222/145.6; 138/97, 148, 149; 264/269
See application file for complete search history.

(56) References Cited

U.S. PATENT DOCUMENTS

| | | | |
|---|---|---|---|
| 3,263,932 A * | 8/1966 | Ruland .................. 239/304 |
| 3,784,169 A * | 1/1974 | Bockmann et al. ...... 366/159.1 |
| 4,204,612 A | 5/1980 | Schrader et al. |
| 4,407,431 A * | 10/1983 | Hutter, III ............... 222/145.2 |
| 4,527,712 A * | 7/1985 | Cobbs et al. ............... 239/135 |
| 4,809,909 A * | 3/1989 | Kukesh ..................... 239/135 |
| 5,732,742 A | 3/1998 | Mentzer et al. |
| 6,102,304 A | 8/2000 | Gonitzke et al. |
| 6,663,016 B2 * | 12/2003 | Bien ......................... 239/428 |
| 6,666,385 B1 | 12/2003 | Gonitzke et al. |

* cited by examiner

*Primary Examiner*—Steven J. Ganey
(74) *Attorney, Agent, or Firm*—Crowell & Moring LLP; John W. Ryan

(57) ABSTRACT

A method and a self-contained, mobile dispensing system, wherein the material to be dispensed is formed by mixing several reactants. A generator provides power to the overall system. Storage tanks are provided for storing the reactants. A chiller unit chills the reactants, and a heating unit heats the reactants. The reactants flow separately through the system until they reach a mix head nozzle operative to combine the reactants. The mix head nozzle has an elongated straight cylindrical shape and includes a plurality of orifices oriented to allow mixing of the reactants in a dispense mode of operation. A metering pump controls and supplies the reactants to the mix head nozzle, in stoichiometric proportions and at predetermined temperature and pressure. A hose connects the mixing tank to the mix head nozzle for dispensing the foam in situ.

14 Claims, 4 Drawing Sheets

THE MIX HEAD NOZZLE

MOBILE PUMPING UNIT FOR DISPENSING INSULATING MATERIAL IN SITU

FIELD OF INVENTION

The present invention relates generally to a mobile pumping system and more particularly to a mobile pumping system for dispensing piping insulation material.

BACKGROUND OF THE INVENTION

In established regions or municipalities, particularly those that are densely populated, underground pipes carry steam, hot water, or other heat and energy source materials, to commercial, industrial, and residential buildings. In order to reduce heat dissipation through these, mostly metallic, pipes they are insulated during installation. However, due to shortcomings in design or workmanship, or damage from environmental elements or aging, some of the original insulation systems fail as effective barriers to heat loss.

Generally, the design of regional or municipal underground piping uses metal pipes laid inside concrete or tile conduits. Between the steel carrier pipes and the outer conduits, there exist open air spaces. Thus, insulating materials are needed to fill the gap between the inner metallic pipes and the outer concrete or tile conduits. These air spaces are filled with a closed cell, high temperature, plastic foam insulation (polyisocyanurate foam) as a means of reinsulating the underground lines. This process, also known as "Condufill$^{SM}$.", uses a high temperature Teflon hose to apply the insulating foam through a vacuum, excavation or a manhole. Such process, however, requires a dispensing system with a suitable metering device to supply the materials which make up the insulating foam to the injection hoses for application to the conduit air spaces.

SUMMARY OF THE INVENTION

The present invention addresses, among others, the need for delivering through an injection hose a well-blended mixture of chemical reactants, at the proper flow rate and temperature, for in situ application of the polyisocyanurate insulation to existing pipe systems. In accordance with the purpose of the present invention a self-contained, mobile system is provided with a suitable metering pump capable of delivering a well-blended mixture of the chemical reactants through an injection hose of up to 80 feet from the mixhead The metering pump provides the mixture at a combined flow rate that is suitable for the required hose length and varying temperature conditions. For example, the metering pump is capable of providing a combined flow rate averaging 50 pounds a minute for a particular injection hose length and temperature. The mobile system carries a significant quantity of reactant products and maintains them at temperatures that yield the reaction mixture at a given conversion when it exits the injection hose.

In a typical implementation of the mobile system, it is configured as a self-contained, mobile foam dispensing system, wherein the foam is formed by mixing several reactants. In addition to the metering pump, the mobile system includes a generator that provides power to the overall system. Holding tanks, each for storing a reactant, are provided in the mobile system along with a chiller unit for chilling the reactants, and a heating unit for heating the reactants. A mix head nozzle is provided in the mobile system for mixing the reactants. The mix head nozzle has an elongated straight cylindrical shape and includes a plurality of orifices oriented to allow mixing of the reactants in a dispense mode of operation. The metering pump controls and supplies the reactants to the mix head nozzle, in stoichiometric proportions and at predetermined temperature and pressure. The system additionally includes a hose connecting the mixing tank to the mix head nozzle. The mix head nozzle is secured to the hose, and its elongated shape allows a better fit to the hose and room for more than one clamp for securing it to the hose. This configuration minimizes the risk of the hose coming off the nozzle during dispensing mode.

In one embodiment, the mobile system also includes bypass valves that permit high speed circulation of the constituent reactants without passing through the mix head nozzle. By circulating through the bypass valves, the reactants avoid friction-induced heating.

In yet another embodiment, in-line temperature probes and console readouts are additionally provided in one or more locations throughout the mobile system. These in-line probes and readouts are provided for temperature monitoring of the constituent and mixed reactants.

In yet another embodiment, the system further includes agitators. The agitators are provided along with the holding tanks and heaters for preheating the reactants in a uniform way and for reducing fluctuations in temperature during dispensing mode.

In yet another embodiment, a self-sufficient mobile system is used to perform a method for dispensing materials in situ. The method involves pressurizing one or more chemical ingredients, including passing the chemical ingredients through a respective metering pump. To achieve a mixing temperature heating and cooling the chemical ingredients are heated and cooled, including by re-circulating them through a heat exchanger that interfaces with heater and cooler units. The method further involves passing the chemicals through a mix head nozzle that receives the chemical ingredients as separate flows and, for more than one chemical ingredient, combines them to form the material. Again, the metering pump is operative to supply each of the chemical ingredients to the mix head nozzle in stoichiometric proportions and at predetermined temperature and pressure. The material is then dispensed in situ through a hose.

As can be further appreciated, being self-contained and mobile the system is more efficient and easy to use. With this system, set up and disassembly are not required each time it is brought to a new location. Moreover, the mobile system is more easily maneuverable as the metering components, including the generator and compressor, are contained in it and there is no need to tow them separately.

These and other features, aspects and advantages of the present invention will become better understood from the description herein, appended claims, and accompanying drawings as hereafter described.

BRIEF DESCRIPTION OF THE DRAWINGS

The accompanying drawings which, are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION OF THE PREFERRED EMOBODIMENTS

Figure 1:
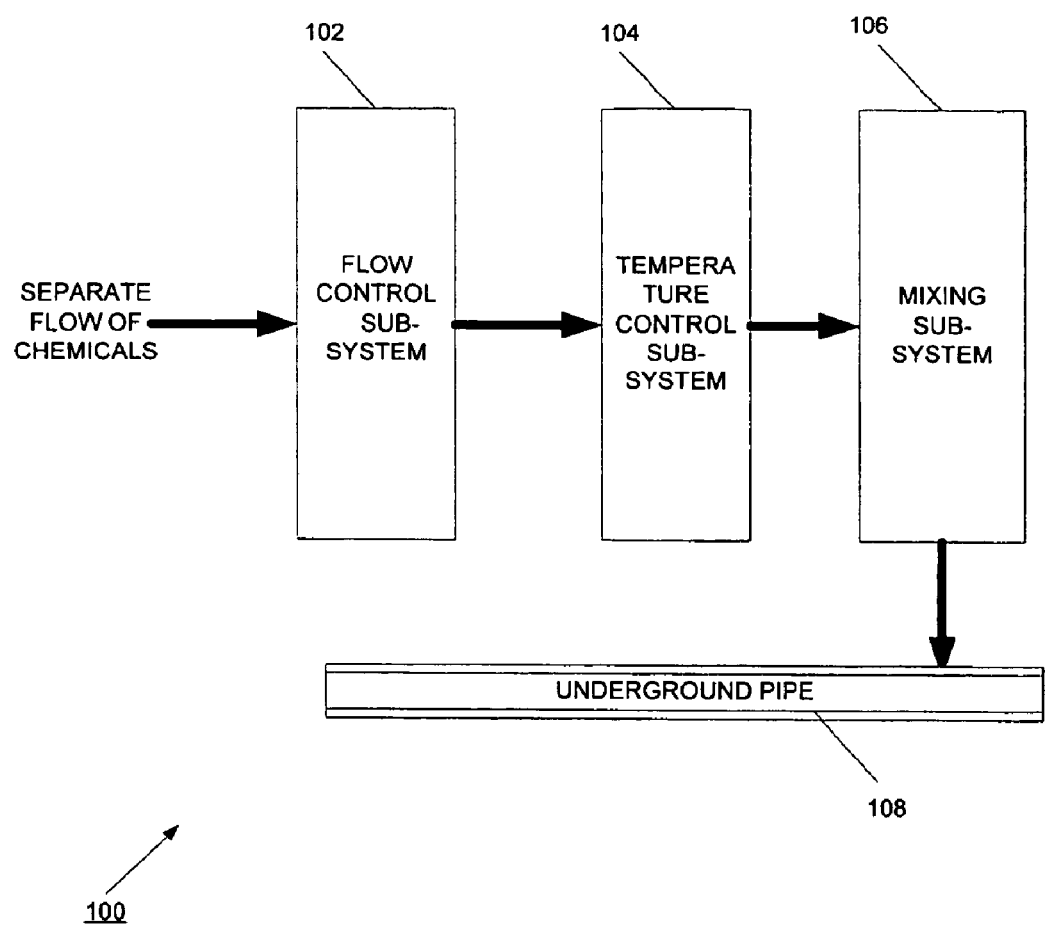
FIG. 1 illustrates the functional subsystems of a mobile pumping system.

The present invention addresses the aforementioned needs associated with application of insulation to underground piping. As mentioned, underground piping require repairs to maintain their effectiveness as barriers to energy loss.

By following the steps outlined in U.S. Pat. No. 5,732, 742, entitled "Method for re-insulating installed steam pipe in situ," which is incorporated herein by reference, it is possible to fill the cylindrical air spaces with a plastic foam insulation (polyisocyanurate foam). The process for re-insulating underground steam pipe in situ first involves creating at least one hole in a suitable location in the ground and inserting a liner into the hole. Then, using a drill, torch or jack-hammer, a hole is opened into the conduit to allow insertion of a tubing through the conduit (through the liner). A first end of the tubing is positioned next to the pipe and a second end of the tubing is attached to a pumping system. The foam is then pumped through the tubing around the pipe. Once the tubing is removed and the foam is allowed to cure it becomes a rigid insulation for the pipe.

Such procedure uses a mobile foam dispensing system in which the foam is formed by mixing several reactants, and it requires a suitable metering device to supply the foam materials to the injection hoses. Accordingly, a self contained, mobile system is provided with a suitable metering pump capable of delivering a well-blended mixture of the chemical reactants through an injection hose. With this metering pump, the combined flow rate of the reactants varies based hose lengths and temperatures, averaging 50 pounds a minute, with dispensing from a hose of up to 80 feet in length. To operate, the mobile system is powered by a generator.

The mobile system carries a significant quantity of reactant materials and needs to maintain them at temperatures that yield a proper mixture at a given conversion when the mixture exits the injection hose. Thus, the mobile system includes holding tanks, each for storing a reactant, along with a chiller unit for chilling the reactants, and a heating unit for heating the reactants. Preferably, the mobile system further includes agitators for allowing the reactant to cool and heat uniformly. To monitor the constituent reactants and mixture in the mobile system, it is configured with one or more in-line probes and console readouts. For mixing the reactants, the mobile system is equipped with a mix head nozzle. The mix head nozzle has an elongated straight cylindrical shape and includes a plurality of orifices oriented to allow mixing of the reactants in a dispense mode of operation. The metering pump controls and supplies the reactants to the mix head nozzle, in stoichiometric proportions and at predetermined temperature and pressure. To apply the mixture in situ, the mobile system additionally includes a hose connecting the mixing tank to the mix head nozzle. As mentioned, the mix head nozzle is secured to the hose, and its elongated shape allows a better fit to the hose and room for more than one clamp for securing it to the hose. This configuration minimizes the risk of the hose coming off the nozzle during dispensing mode.

More broadly, FIG. 1 shows the functional sub-systems of a mobile pumping system. Functionally, this system 100 includes a flow control sub-system 102, a temperature control sub-system 104 and a chemical mixing sub-system 106. In this exemplar configuration, the reactants (constituent chemical components of the plastic foam insulation) flow separately as they enter into the flow control sub-system 102. Each of the three reactants is transferred from a container, e.g., a 55-gallons drum, to a separate holding tank, using a reciprocating drum pump. In one configuration the combined capacity of the three holding tanks exceeds 2400 pounds, which provides for storage of chemicals sufficient to fill 200-500 feet of conduit depending on the size of the conduit void. Each of the reactants is expected to reach a desired pressure and temperature before the mixing stage as it flows through the system 100. Accordingly, the reactants are pumped out of the flow control sub-system 102 at the proper pressure and in the proper stoichiometric proportions. As they are pumped out, the reactants circulate through the temperature control sub-system 104 until they achieve the desired mixing temperature. Then, the reactants are mixed in the mixing sub-system 106 and the resulting foam is applied in situ to the pipe 108.

As they circulate, the reactants pass through in-line heaters which heat them. In some instances, the external areas of each of the holding tanks are fitted with band heaters to expedite the heating of the reactants when required. Furthermore, an agitator is added to each holding tank 204 to allow for a more uniform temperature distribution of the reactant within the tank.

In one embodiment, bypass valves are installed to permit high-speed circulation of the reactants without passing through the mix head 106 and gaining friction heat. This process allows the reactant chemicals at each location, (the pumps, hoses and fittings) to acquire a stabilized temperature, which reduces fluctuations, during the dispensing mode.

Figure 2:
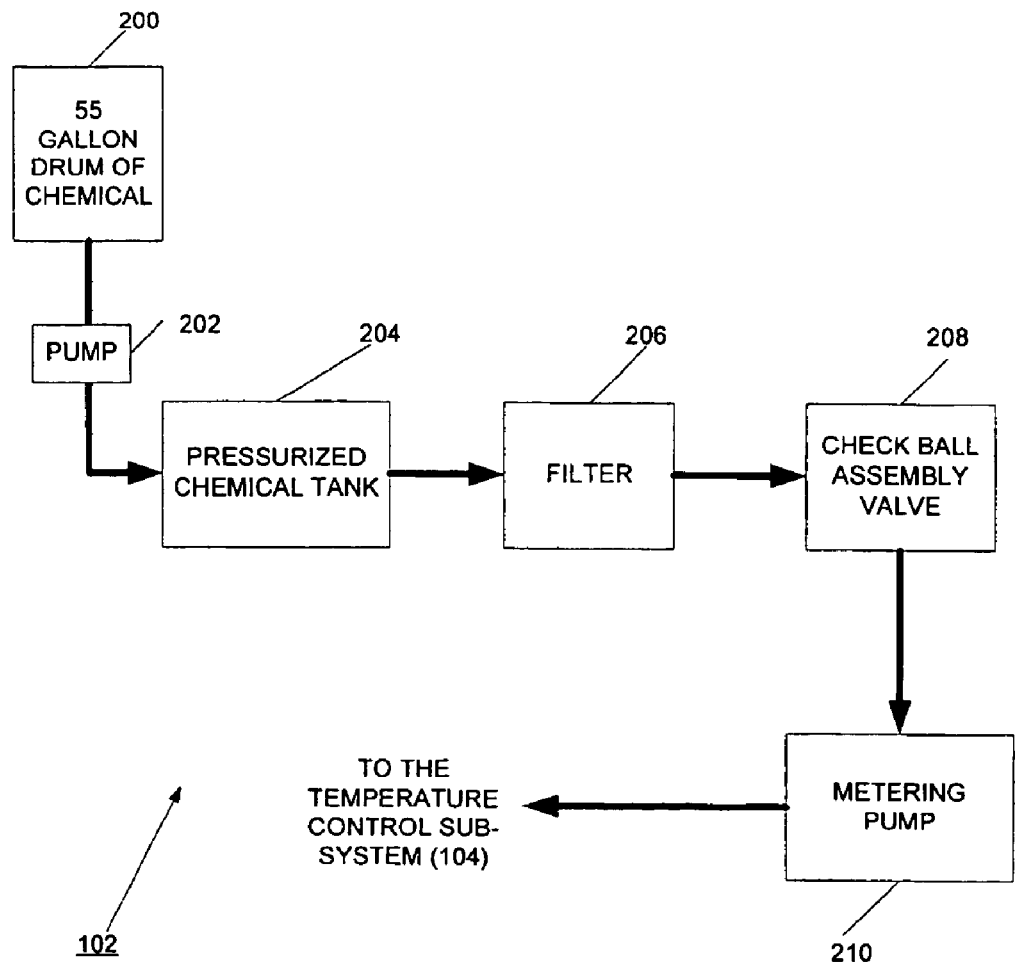
FIG. 2 illustrates the flow path for a reactant through the flow control sub-system.

FIG. 2 depicts the flow path for a constituent chemical within the flow control sub-system 102. The flow control sub-system 102 includes separate holding tanks 204, filters 206, check ball assembly valves 208, and metering pumps 210 for each of the constituent chemicals. Each of the constituent chemicals is kept isolated from the others throughout its flow within the system 100, until it reaches the mixing sub-system (106 in FIG. 1). Thus, from the flow control sub-system 102, the flow paths for this and each of other chemical constituents (reactants) continue separately until they reach the mixing sub-system 106.

As further illustrated, each of the chemical constituents of the insulating foam is initially held in a separate 55 gallon drum 200, and from there it is transferred to a separate chemical holding tank 204, using reciprocating drum pump 202. In this instance, each holding tank is pressurized using a blanket of dry air pumped on top of the chemical. The resulting pressure of, approximately, 40-50 psig is maintained by the air blanket for as long as the mobile pumping system is operating. The air pressure in each holding tank forces the respective reactant out of its holding tank 204. And, as each reactant traverses the system separately before it reaches the mixing subsystem (106, FIG. 1), it is pushed through a respective screen filters 206 and the check valve (ball assembly valve) 208 into a respective low pressure side of the metering pump 210. The metering pump 210 controls the respective flow of each reactant out of the flow control sub-system 102 and into the temperature control sub-system 104.

Figure 3:
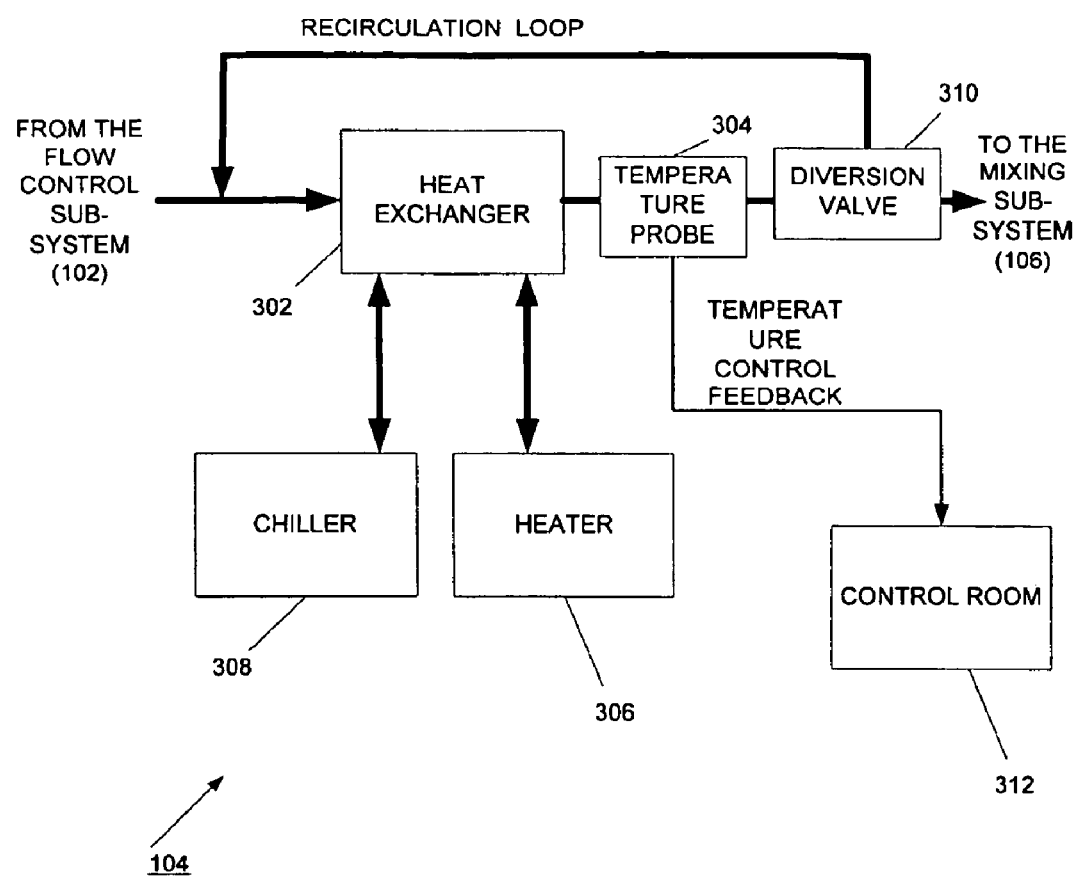
FIG. 3 illustrates the flow path for a reactant through the temperature control sub-system.

FIG. 3 depicts the flow path for each reactant through the temperature control sub-system 104. Each separate reactant path within the temperature control sub-system includes a heat exchanger (e.g., shell and tube heat exchanger) 302, a temperature probe (thermocouple) 304, and a control (diversion-recirculation) valve 310. The chiller 308 and heater 306 operate to directly or indirectly heat or cool each of the reactants as they flow through the respective heat exchanger 302. For example, a reactant passing through the respective heat exchanger 302, is heated and cooled indirectly by a heat transfer fluid such as a water-glycol solution that is, in turn, heated by the heater 306 or cooled by the chiller 308. The heat transfer fluid flows through one side of a shell and tube heat exchanger as the reactant flows on the other side.

The temperature probe 304 monitors the temperature of each reactant as it flows out of its respective heat exchanger 302. The reactants are respectively heated and cooled to the ideal temperature for mixing. Feedback from each temperature probe 304 is directed to a control center 312, where based on the temperature reading for each reactant, an operator can open or close a valve controlling the heat transfer fluid flow from the heater 306 or heat transfer fluid flow from chiller 308.

Additionally, until the ideal mixing temperature is achieved the operator controls the diversion-recirculation valve 310 for directing the reactants into a recirculation loop. Once the ideal mixing temperature is achieved, the recirculation diversion valve 310 is closed and each of the constituent reactants flows to the mixing sub-system 106.

In one implementation, one or more in line temperature probes and console readouts for the temperature probes 304 are installed in one or more locations through the mobile system. In particular, to further monitor temperature levels of the reactant, temperature probes and readouts are installed at the supply strainer locations and just prior to the entrance to the mix head (mixing sub-system 106). By providing more accurate temperature readings of the reactant chemicals throughout the re-circulation mode, the operator can monitor the quality of the heating and cooling process as the mobile system is started and brought up to the proper state of operation.

For allowing the operator to utilize more of the pre-heated and prepared chemicals for dispensing, low-level bypass switches are installed on the holding tanks. This allows the operator to bypass automatic shut off valves intended to prevent extraction of the reactants from the holding tanks when they reach a level of 15% or less.

Figure 4:
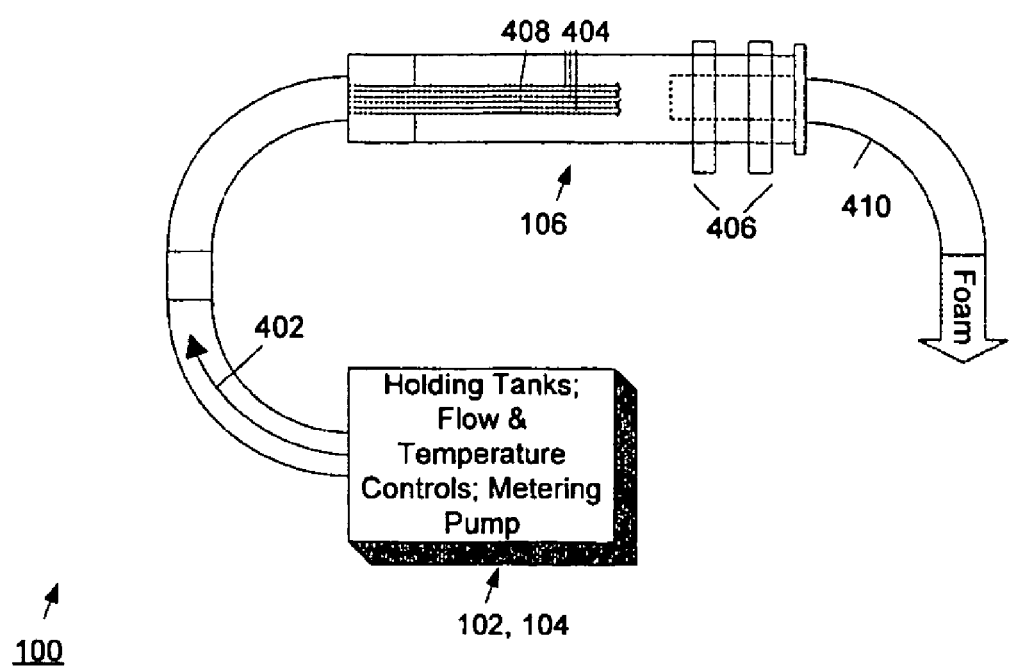
FIG. 4 illustrates the mobile system with a mixing sub system in more detail.

At the final stage of their flow, the reactants are combined in the mixture sub-system 106 to produce the foam insulation. FIG. 4 shows the mobile system with more details of the mixing sub-system 106 in which the reactants 402 are combined to form the insulating foam being dispensed through a hose 410. The mixing sub-system 106 includes a mix head with three small diameter orifices 404 oriented in such a way that the flow through each will hit the flow of the other two when in the dispense mode.

In the recirculation mode, there is a cleanout plunger 408 simultaneously blocking the path from one orifice to the other and allowing the chemicals to flow through a recirculation port (not shown). In operation, once the start button is pressed, and the pressure build timer expires, the cleanout plunger opens, blocking the recirculation ports while opening the mixing chamber. This allows the three chemicals 402 to contact each other in the center of the mixing chamber at a very high velocity, due to the small hole in the orifices 404. This is called impingement mixing and it ensures that the three separate chemicals are perfectly mixed.

Preferably, as shown, the mix head is mounted to the truck wall at a higher location to allow the operator a clearer view of the areas for the calibration of the unit while pumping. This helps reduce over-pressure and lost mix head shots when pumping. The higher location also makes service of the needles and orifices on the mix head quicker and easier.

Preferably also, the mix head nozzle of the unit 106 is modified from the standard, tapered design to a straight milled and lengthened nozzle. This design allows the hose to fit better and creates more room for the dual securing clamps 406. A better and more secure fit reduces the risk of the hose separating from the nozzle during the dispensing mode.

In addition to these improvements, one embodiment of the mobile system further includes an outside fan unit to help displace heat from the generator and push cooler air through the chiller. This improves cooling time of the reactants.

In yet another embodiment, quieter, muffled and smaller generators are used in place of PTO (power take off) and hydraulic generators as power sources for the electrical panel of the mobile system. This saves space within the box of the truck, reduces overall weight of the vehicle, and reduces wear and tear on the engine when the PTO runs.

In sum, although the present invention has been described in considerable detail with reference to certain preferred versions thereof, other versions are possible. Therefore, the spirit and scope of the appended claims is not limited to the description of the preferred versions herein.

I claim:

1. A self-contained, mobile foam dispensing system for application of foam insulation around underground piping, wherein the foam is formed by mixing several reactants, the system comprising:
    a power source operative to provide power to the system;
    holding tanks, each for storing one of the reactants;
    temperature control sub-systems including respective chillers operative to chill respective reactants and heaters operative to heat the respective reactants;
    a mix head nozzle operative to mix the reactants so as to form said foam, the mix head nozzle having an elongated straight cylindrical shape to which an injection hose for dispensing the foam around said piping is clampable, as well as a plurality of orifices oriented to allow mixing of the reactants in a dispense mode of operation; and
    metering pumps operative to supply the reactants to respective ones of the temperature control sub-systems in stoichiometric proportions and at predetermined pressures.

2. The system of claim 1, wherein each holding tank includes an agitator for maintaining therein a uniform temperature.

3. The system of claim 1, further comprising band heating elements operative to heat external areas of each holding tank.

4. The system of claim 1, wherein the temperature control sub-systems include temperature probes to monitor temperature levels of the reactants at predetermined locations within the system.

5. The system of claim 1, wherein each temperature control sub-system further comprises a valve operative to permit high-speed circulation of the reactants without passing through the mix head nozzle.

6. The system of claim 1, wherein each of the plurality of orifices has a predetermined diameter.

7. The system of claim 1, wherein the hose has a length for dispensing the foam in situ, and wherein both temperatures of the reactants and the predetermined pressures are adjustable to fit the length of the hose.

8. The system of claim 1, further comprising band heaters fitted around the holding tanks.

9. The system of claim 1, wherein each holding tank has a bypass switch and an automatic shutoff valve, and wherein the bypass switch is operative to bypass the automatic shutoff valve.

10. The system of claim 1 further comprising, for each reactant, at least one temperature probe and at least one readout to monitor the temperature.

11. The system of claim 1, wherein the power source is a generator.

12. The system of claim 1, wherein the mix head nozzle is operative to receive the reactants as separate flows, wherein the metering pumps include a metering pump for each of the reactants, wherein the hose connected for dispensing the foam in situ.

13. The system of claim 12, wherein each of the metering pumps is disposed in a flow control sub-unit that includes, for each reactant flow, a filter and a check valve assembly.

14. The system of claim 12, wherein each of the temperature control sub-systems includes a temperature probe, a readout for measuring a reactant temperature, a heat exchanger operative to interface with the chillers and heaters, a circulation-diversion valve, and a recirculation loop through which the reactant returns to the heat exchanger from the circulation-diversion valve.

\* \* \* \* \*